United States Patent [19]

Farris et al.

[11] Patent Number: 5,192,812
[45] Date of Patent: Mar. 9, 1993

[54] CELL OPENERS FOR URETHANE FOAM SURFACTANTS

[75] Inventors: David D. Farris; James D. Reedy, both of Marietta, Ohio; Raymond L. Cobb, Buda, Tex.

[73] Assignee: Union Carbide Chemicals & Plastics Technology Corporation, Danbury, Conn.

[21] Appl. No.: 654,232

[22] Filed: Feb. 12, 1991

[51] Int. Cl.$^5$ .................... C08J 9/04; C08G 18/06; C08F 203/00

[52] U.S. Cl. ................... 521/112; 521/111; 521/155; 521/170; 521/174; 525/474; 525/477; 252/352

[58] Field of Search ............. 521/111, 112, 155, 170, 521/174; 528/38; 525/102, 474, 477; 252/352; 556/450, 453, 457

[56] References Cited

U.S. PATENT DOCUMENTS

| | | |
|---|---|---|
| Re. 28,715 | 2/1976 | Stamberger . |
| Re. 29,118 | 1/1977 | Stamberger . |
| 2,683,730 | 7/1954 | Seeger et al. . |
| 2,950,263 | 8/1960 | Abbotson et al. . |
| 3,012,008 | 12/1961 | Lister . |
| 3,344,162 | 9/1967 | Rowton . |
| 3,346,557 | 10/1967 | Patton, Jr. et al. . |
| 3,362,979 | 1/1968 | Bentley . |
| 3,594,334 | 7/1971 | Marlin . |
| 3,637,541 | 1/1972 | Rossmy . |
| 3,652,639 | 3/1972 | Pizzini et al. . |
| 3,793,237 | 2/1974 | Watkinson . |
| 3,823,201 | 7/1974 | Pizzini et al. . |
| 3,850,861 | 11/1974 | Fabris et al. . |
| 3,935,123 | 1/1976 | Prakai et al. .................... 252/351 |
| 3,980,688 | 9/1976 | Litteral et al. . |
| 4,147,847 | 4/1979 | Schweiger .................... 521/112 |
| 4,293,611 | 10/1981 | Martin .................... 525/102 |
| 4,390,645 | 6/1983 | Hoffman et al. .................... 521/137 |
| 4,431,754 | 2/1984 | Hoffman .................... 521/137 |
| 4,454,253 | 6/1984 | Murphy et al. .................... 521/129 |
| 4,454,255 | 6/1984 | Ramlow et al. .................... 521/137 |
| 4,458,038 | 7/1984 | Ramlow et al. .................... 521/137 |
| 4,550,194 | 10/1985 | Reichel et al. .................... 560/200 |
| 4,751,251 | 6/1988 | Thornsberry .................... 521/112 |
| 4,800,026 | 1/1989 | Coffindaffer et al. .................... 528/38 |
| 4,855,379 | 8/1989 | Budnik et al. .................... 528/29 |
| 4,904,705 | 2/1990 | Gerkin et al. .................... 521/163 |
| 4,911,852 | 3/1990 | Coffindaffer et al. .................... 528/38 |
| 5,045,571 | 9/1991 | Blevins et al. .................... 521/111 |

FOREIGN PATENT DOCUMENTS

| | | |
|---|---|---|
| 0043110 | 6/1981 | European Pat. Off. . |
| 0354511 | 2/1990 | European Pat. Off. . |
| 1215921 | 5/1966 | Fed. Rep. of Germany . |
| 2615804 | 10/1977 | Fed. Rep. of Germany . |
| 3928867 | 10/1990 | Fed. Rep. of Germany . |

OTHER PUBLICATIONS

Chemical Abstract 96:182547w Siloxane Copolymer Mixtures Useful as Foam Stabilizers in High Resilience Polyurethane Foam.

*Primary Examiner*—Morton Foelak
*Assistant Examiner*—John N. Cooney, Jr.
*Attorney, Agent, or Firm*—W. F. Gray

[57] ABSTRACT

Compositions including silicone surfactants of the type used in manufacturing urethane foams and certain siloxane-oxyalkylene copolymers which act as cell openers when employed in combination with silicone surfactants in urethane foam manufacture are disclosed and claimed, as are urethane foam compositions including such cell operers, a method of preparing urethane foams using such cell operers, and urethane foams prepared by the method.

15 Claims, No Drawings

CELL OPENERS FOR URETHANE FOAM SURFACTANTS

FIELD OF THE INVENTION

This invention relates to siloxaneoxyalkylene copolymers, and more particularly, to certain such materials which when employed in combination with silicone surfactants used for urethane foam manufacture produce more open foams than are produced by the traditional silicone surfactants alone.

BACKGROUND OF THE INVENTION

In the stabilization of conventional flexible polyurethane foam a careful balance of properties must be achieved. Two of the more important surfactant-dependent properties which must be balanced are height of rise and foam porosity. For good heights of rise the foam bubbles need to maintain their integrity (remain closed) to achieve the full potential of the expanding gases, i.e. low density, with a minimum density gradient from the top to bottom of the foam. The types of foam used for furniture cushions and bedding must also ultimately have a large fraction of open cells.

An excessive number of closed cells will cause the foam to shrink and distort as the gases within the closed cells start to cool. Also, if too many cells are closed or partially closed the foam will lack resiliency, that is, after being subjected to distortion the foam will not return rapidly to its original configuration. Thus, the ideal surfactant for polyurethane foam would allow essentially all of the bubbles to stay intact until the foam approached its maximum rise, but at that point it would be desirable for a high percentage of cell walls to open without damaging the skeletal network of the foam. It is also important that there not be densification at the bottom of the foam.

Within the commercially useful concentration range of surfactants, one has historically found an inverse relationship between height of rise and foam porosity. Thus, as air flow (breathability) increases there is generally a predictable loss in height of rise (i.e. increased density).

In some commercially used polyurethane foam formulations it becomes necessary to increase the surfactant concentration to achieve finer or more uniform cells in the foam. With most commercial surfactants, increasing the surfactant concentration causes an undesirable decrease in foam porosity.

The use of mixed polyether reactants to form flexible polyurethane foam surfactants were first described by R. Gerd in U.S. Pat. No. 3,637,541 in 1972.

This patent appears to cover both hydrolyzable and non-hydrolyzable types of silicone surfactants, i.e., those having SiOC and SiC linkages respectively, to polyethers. The first of the two polyethers employed had a m.w. range of 1600-4000 and contained 20-100% ethylene oxide units, and the second had a m.w. range of 400-1200 and contained 65-100% ethylene oxide.

The merits of using a blend of polyethers of high and low molecular weight (all having essentially the same ethylene oxide content) to form "hydrolyzable" silicone surfactants for flexible polyurethane foam was recognized in a UCC patent to Litteral, Mullins and Lee, U.S. Pat. No. 3,980,688 in 1977. These surfactant structures produced foams having a better combination of air flow and height of rise than could be achieved with siloxane-polyether copolymers derived from a single polyether.

No suggestion was made in either of these patents to react polyethers separately with silicones to make high efficiency cell openers which could be used as additives for primary surfactants.

Several examples can be found in the literature of silicone surfactants which have been improved by addition of organic or other surfactants. Most of these were employed in applications other than conventional flexible polyurethane foam, such as rigid polyurethane foam, high resilience polyurethane foam, and polyester foam. A polyester foam surfactant composition which was a blend of a conventional polyester foam surfactant with an organic sodium sulfonate was taught in U.S. Pat. No. 3,594,334, issued in 1971. Subsequently a sulfonated castor oil was proposed as a co-surfactant for polyester foam in German patent 2,615,804, issued in 1977. Blends of cyanoalkyl-containing silicones and more conventional polyether-silicone surfactants have been shown to reduce the flammability of polyurethane foam. See U.S. Pat. No 3,935,123, issued in 1976. Improved surfactant compositions for rigid foam have been obtained using a combination of an organic surfactant and a standard silicone surfactant. See U.S. Pat. No. 4,751,251, issued in 1988.

A recent European patent application by Dow Corning Corporation, EP 0 354 511 A1, teaches that mixtures of conventional silicone surfactants with an organic surfactant such as Pluronic P-84 produce foams having improved air flows. In an example, an improvement in air flow from 7 ft$^3$/min to 8 ft$^3$/min was seen when a 50/50 mixture was used.

German patent 3928867 C1 of Kollmeier et al. discloses amino-containing silcone-polyether copolymers as cell openers for certain polyurethane foams.

There are also examples in the literature of high resilience urethane foams stabilized with blends of surfactants. See, for example, the patent application by Baskent and Prokai described in CA96(22):182547w. This reference discloses using a conventional surfactant for high resilience foam and minor amounts of a conventional flex foam surfactant to improve foam stability.

It would be desirable to be able to increase urethane foam porosity by >20% without losing more than a few percent in height of rise. It would be very desirable to be able to increase foam porosity by 50% or more with essentially no loss in height of rise. This need is answered by the "cell opener" materials of the present invention.

SUMMARY OF THE INVENTION

The present invention provides certain siloxane-oxyalkylene copolymers which are capable of modifying the behavior of traditional silicone surfactants employed in the manufacture of polyurethane foam, to give more open foams than are produced by use of the traditional surfactants alone.

These "cell-opener" materials differ from the primary surfactants with which they are employed, in that they have a tendency to be less soluble in the urethane foam-forming media than the primary silicone surfactants, and the attached polyether groups are generally somewhat more polar than the average polarity of the polyether groups of the primary surfactants, usually by virtue of containing higher percentages of ethylene oxide units and lower percentages of propylene oxide units than are contained on average in the primary surfactants.

Solubility of the silicone copolymers is a function of the molecular weight of the silicone, the ratio of polyether to silicone, and the length and polarity of the polyether chains, among other factors.

An additional characteristic of the cell-openers of the invention is that the ratio of hydrophilic character (H) to lipophilic character (L) is greater than or equal to 0.3, materials having H/L ratios less than this number being defoamers which cause foam collapse. The meanings of these terms are defined below.

Further, the weight % of the polyether groups of the cell openers is less than that of the primary silicone surfactants with which they are used.

The cell openers of the invention offer the substantial and unpredicted advantage that they permit traditional silicone surfactants to be modified for the production of relatively more open foam without substantially impairing their ability to stabilize the foam during the manufacturing process.

Using the cell opening agents of this invention, it is possible to prepare foams over a relatively large range of surfactant concentrations without substantially changing air flow. In some cases primary surfactant concentration may be doubled without losing foam porosity. Conversely, at a constant primary surfactant level, removing a portion of the stabilizer and replacing it with cell opener causes little or no loss in height of rise of the foam, and a substantial gain in air flow in the product.

To summarize, the cell openers of the present invention afford the advantages that they (1) enhance airflow without substantially affecting height of rise of foams employing them, (2) allow the properties of the primary surfactant to be altered to give greater consistency in foam rise and air flow by blending in the appropriate amount of cell opener, and (3) allow surfactant concentrations to be changed in the foam formulation without significantly changing air flow of the resulting foam.

DETAILED DESCRIPTION OF THE INVENTION

The cell openers of the invention, which are referred to in the claims as the "second silicone polyether copolymers", are siloxane-oxyalkylene copolymers having the generalized formula I

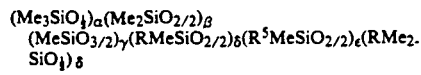
(I)

wherein $\alpha + \zeta = \gamma + 2$:
$\alpha = 0$ to $(\gamma + 2)$, preferably $(\gamma + 2)$;
$\beta = 10$ to 180, preferably 40 to 130, most preferably 50 to 120;
$\gamma = 0$ to 15, preferably 0 to 3, most preferably 0;
$\delta = 1$ to 40, preferably 4 to 15, most preferably 5 to 12;
$\epsilon = 0$ to 20, preferably 0;
$\zeta = 0$ to $(\gamma + 2)$, preferably 0; and
$\delta + \zeta \geq 2$.

In formula I the sum of $\zeta$, $\beta$, $\gamma$, $\delta$, $\epsilon$ and $\zeta$ is greater than or equal to 20 and less than or equal to 200, preferably 45 to 160, most preferably 60 to 135.

The group R is $-(CHR')_nO(C_2H_4O)_x(C_2H_3R''O)_zQ$ or a mixture thereof, in which $n = 2$ to 10, preferably 3, and $x + z = 5$ to 40, z preferably being 0 and x preferably being 6 to 14. The ratio $x/(x+z)$ is $\geq 0.4$, and preferably greater than 0.6. When $z = 0$, x is $\leq 18$.

The group R' is H, alkyl of 1 to 3 carbon atoms, phenyl, or alkyl-substituted phenyl in which the alkyl substituents contain 1 to 2 carbon atoms. R' is preferably H or an alkyl group of 1 to 3 carbon atoms, most preferably H. The R' groups may be the same or different.

The group R" is alkyl of 1 to 18 carbon atoms, phenyl, or alkyl-substituted phenyl in which the alkyl substituents contain 1 to 4 carbon atoms, and is preferably a methyl group.

The group Q is selected from the group consisting of:
H;
alkyl of 1 to 18 carbon atoms;
benzyl;
alkyl-substituted benzyl in which the alkyl substituents contain 1 to 4 carbon atoms;
$-CO_2R^2$ in which $R^2$ is alkyl of 1 to 2 carbon atoms;
$-CONHR^3$ in which $R^3$ is alkyl of 1 to 3 carbon atoms, phenyl, or alkyl-substituted phenyl in which the alkyl substituents contain 1 to 4 carbon atoms; and
$-COR^4$ in which $R^4$ is alkyl of 1 to 18 carbon atoms, phenyl, or alkyl-substituted phenyl in which the alkyl substituents contain 1 to 4 carbon atoms.

Q is preferably alkyl of 1 to 4 carbon atoms or $-COR^4$ in which $R^4$ is alkyl of 1 to 3 carbon atoms, and is most preferably a methyl or acetoxy group.

The group $R^5$ is alkyl of 2 to 18 carbon atoms, phenyl, phenyl-substituted alkyl of 2 to 3 carbon atoms, or cyano- or fluoro- substituted alkyl of 2 to 18 carbon atoms.

In addition, the ratio of the hydrophilic character H of the cell opener to its lipophilic character L as defined herein below is greater than or equal to 0.3.

Preferred cell openers are materials as generally described above, in which $\gamma = 0$, $\epsilon = 0$, the sum of $\alpha + \beta + \delta + \zeta$ is greater than or equal to 45 but less than or equal to 160, and the ratio $x/(x+z)$ is $\geq 0.7$.

Particularly preferred cell openers are materials as generally described above, in which $\gamma = 0$, $\epsilon = 0$, $\zeta = 0$, $\zeta = 4$ to 40, the sum of $\alpha$, $\beta$, and $\delta$ is greater than or equal to 60 but less than or equal to 135, and the ratio $x/(x+z)$ is $\geq 0.7$.

In the above-defined preferred and particularly preferred cell openers, z in substituent R is most preferably 0, and x in substituent R is most preferably 6 to 14.

The primary surfactants with which the cell openers are employed, which are referred to in the claims as "first silicone polyether copolymers", are silicone polyether copolymers of the sort used for conventional flexible polyurethane foam. Two basic types have been used historically, so-called hydrolyzable surfactants in which the polyether units are linked to the siloxane via Si—O—C linkages, and so-called nonhydrolyzable surfactants in which the polyether units are linked to the siloxane via Si-hydrocarbon-O linkages. Such surfactants and their methods of preparation are known to the art. More particularly, the primary surfactants are silicone polyether copolymers in which the copolymer backbone possesses at least 20 Si—O—Si linkages, more than 50% of the Si atoms carry at least two methyl groups, and the sum of the atomic masses of the oxyethylene units and the oxypropylene units constitute at least 50% of the average molecular weight of the copolymer. These materials are described by the generalized formula II

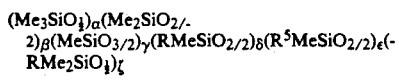

(II)

wherein $\alpha + \zeta = \gamma + 2$;

$\alpha = 0$ to $(\gamma+2)$, preferably $\gamma+2$;

$\beta = 10$ to 180, preferably 40 to 120, most preferably 50 to 100;

$\gamma = 0$ to 15, preferably 0 to 3, most preferably 0;

$\delta = 1$ to 40, preferably 4 to 15, most preferably 5 to 12;

$\epsilon = 0$ to 20, preferably 0;

$\zeta = 0$ to $(\gamma+2)$, preferably 0; and $\delta + \zeta \geq 4$.

In formula II, the sum of $\alpha$, $\beta$, $\gamma$, $\delta$, $\epsilon$ and $\zeta$ is greater than or equal to 20 but less than or equal to 200, preferably 45 to 125, most preferably 60 to 100.

The group R is $-(CHR')_nO(C_2H_4O)_x(C_2H_3R''O)_zQ$ or a mixture thereof, in which n is 0 or 2 to 10, preferably 3, and $x+z$ is 20 to 250, preferably 25 to 100.

The group R' is H, alkyl of 1 to 3 carbon atoms, phenyl, or alkyl-substituted phenyl in which the alkyl substituents contain 1 to 3 carbon atoms. R' is preferably H or alkyl of 1 to 3 carbon atoms, and most preferably H. The R' groups may be the same or different.

The group R'' is alkyl of 1 to 18 carbon atoms, phenyl, or alkyl-substituted phenyl in which the alkyl substituents contain 1 to 4 carbon atoms, and is preferably methyl.

The group Q is selected from the group consisting of:
H;
alkyl of 1 to 18 carbon atoms;
benzyl;
alkyl-substituted benzyl in which the alkyl substituents contain 1 to 4 carbon atoms;
$-CO_2R^2$ in which $R^2$ is alkyl of 1 to 2 carbon atoms;
$-CONHR^3$ in which $R^3$ is alkyl of 1 to 3 carbon atoms, phenyl, or alkyl-substituted phenyl in which the alkyl substitutes contain 1 to 4 carbon atoms; and
$-COR^4$ in which $R^4$ is alkyl of 1 to 4 carbon atoms, phenyl, or alkyl-substituted phenyl in which the alkyl substituents contain 1 to 4 carbon atoms.

Q is preferably alkyl of 1 to 4 carbon atoms or $COR^4$ in which $R^4$ is alkyl of 1 to 4 carbon atoms, and is most preferably methyl or acetoxy.

$R^5$ is alkyl of 2 to 18 carbon atoms, phenyl, phenyl-substituted alkyl of 2 to 3 carbon atoms, or cyano- or fluoro- substituted alkyl of 2 to 18 carbon atoms. It is most preferably alkyl of 2 to 18 carbon atoms.

Preferred primary surfactants are materials as generally described above, in which $\gamma=0$, $\epsilon=0$, the sum of $\alpha$, $\beta$, $\delta$, $\epsilon$, and $\zeta$ is greater than or equal to 45 but less than or equal to 125, and $x+z$ in substituent R is 25 to 100.

Particularly preferred primary surfactants are materials as generally described above, in which $\gamma=0$, $\epsilon=0$, $\zeta=0$, $\delta=4$ to 40, and the sum of $\gamma$, $\beta$, and $\delta$ is greater than or equal to 60 but less than or equal to 100.

The cell opening silicone-polyether copolymers of the invention are employed as additives to the primary surfactants used in polyurethane foam manufacture. In the blend of primary surfactant Plus cell opener, the percentage of cell opener material is from 0.05% to 40%, preferable 0.5% to 25%, and most preferably 1% to 20%. Mixtures of different cell opener materials may be employed with single primary surfactants or mixtures of primary surfactants, and conversely, mixtures of primary surfactants may be employed with single cell opener materials.

There is no necessary relationship between the number of siloxane units in the cell opener and that in the primary surfactant. Depending on the particular cell opener and primary surfactant materials being employed, as well as the foam composition, the siloxane portion of the cell opener may be of higher or lower atomic mass than that of the primary surfactant.

In any combination of primary surfactant and cell opener material, the percent polyether in the cell opener should be at least 5% less than that of the primary surfactant, and preferably at least 10% less.

Procedures for synthesizing silicone-polyether copolymers having siloxane backbones and attached polyalkylene oxide groups are well known. Representative disclosures are provided in U.S. Pat. Nos. 4,147,847 and 4,855,379, relevant portions of which are hereby incorporated by reference.

Typically, both the primary surfactants and the cell openers of the invention are prepared by causing a polyhydridosiloxane of generalized average formula $M^{}D_xD'_yM^{}$ to react with an appropriately chosen allyl-started oxyalkylene polymer or blend thereof in the presence of a hydrosilation catalyst such as chloroplatinic acid. In the formula for the polyhydridosiloxane, $M^{**}$ is $(CH_3)_2(H)SiO_{\frac{1}{2}}$ or $(CH_3)_3SiO_{\frac{1}{2}}$, D is $(CH_3)_2SiO_{2/2}$, and D' represents $(CH_3)(H)SiO_{2/2}$. The allyl-started oxyalkylene polymers are polyethers having a terminal vinyl group, which may optionally be 2-substituted, and containing multiple units derived from ethylene oxide, propylene oxide, or both.

These reagents are mixed, either with or without a solvent such as toluene or dipropylene glycol, heated to about 70°-85° C., then the hydrosilation catalyst is added, a temperature rise of about 10°-15° C. is observed, and the mixture is finally sampled and analyzed for SiH groups by adding an alcohol and base and measuring evolved hydrogen. If a volatile solvent was used, this is removed under vacuum, and the mixture is generally neutralized with a weak base such as $NaHCO_3$, then filtered.

The polyhydridosiloxanes of generalized average formula $M^{}D_xD'_yM^{}$ are prepared in the manner known to the art. For the case in which $M^{}$ is $(CH_3)_3SiO_{\frac{1}{2}}$, an alkyldisiloxane such as hexamethyldisiloxane, a polyhydridosilqxane polymer, and an alkyl cyclosiloxane such as octamethylcyclotetrasiloxane are reacted in the presence of a strong acid such as sulfuric acid. For the case in which $M^{}$ is $(CH_3)_2(H)SiO_{2/2}$, a hydridoalkyldisiloxane such as dihydridotetramethyldisiloxane, a polyhydridosiloxane polymer, and an alkyl cyclosiloxane such as octamethylcyclotetrasiloxane are reacted in the presence of a strong acid such as sulfuric acid.

The allyl-started oxyalkylene polymers, also referred to as polyethers, are likewise prepared in the manner known to the art. An allyl alcohol, optionally bearing a substituent on the 1- or 2-position, is combined with ethylene oxide, propylene oxide, or both, in the presence of an acid or a base, to yield the desired polyether with a terminal hydroxyl group. This is typically capped by further reaction with an alkylating or acylating agent such as a methyl halide or acetic anhydride, respectively. Other end caps may of course be employed.

The cell opener-containing surfactant compositions of the invention are employed in the manufacture of polyurethane foam in the manner known to the art. A method for producing polyurethane foams includes reacting: (a) a polyol alone or in some instances in combination with other polymers with Zerewitinoff active hydrogen atoms, and (b) an organic polyisocyanate and optionally in the presence of (c) additives to produce the polyurethane product. When a foam is being prepared, these additives generally include catalyst, blowing agent, crosslinkers and foam stabilizers. The reaction and foaming operations can be performed in any suitable manner, preferably by the one-shot technique.

In producing the polyurethane foams using the cell opener-containing surfactant compositions of this invention, one or more polyether polyols is employed for reaction with a polyisocyanate reactant to provide the urethane linkage. Such polyols have an average of at least slightly above 2 and typically 2.1 to 6 hydroxyl groups per molecule. They typically also include compounds which consist of carbon, hydrogen, and oxygen, and compounds which may also contain phosphorus, halogen, and/or nitrogen. Such polyether polyols are well known in the art and are commercially available.

Polyols useful in the preparation of polyurethane foams are polyether polyols (such as those described in U.S. Pat. No. 3,346,557), and polymer polyols (such as are described in Re. U.S. Pat. No. 28,715 and Reissue U.S. Pat. No. 29,118 U.S. Pat. No. 3,652,639, U.S. Pat. No. 3,823,201, U.S. Pat. No. 3,850,861, U.S. Pat. No. 4,454,255, U.S. Pat. No. 4,458,038, U.S. Pat. No. 4,550,194, U.S. Pat. No. 4,390,645 and U.S. Pat. No. 4,431,754).

The organic polyisocyanates that are useful in producing polyether polyurethane foams in accordance with the teachings of this invention are also well known in the art, and are organic compounds that contain at least two isocyanate groups. Any such compounds or mixtures thereof can be employed.

Suitable organic polyisocyanates include the hydrocarbon diisocyanates (e.g., the alkylene diisocyanates and the arylene diisocyanates), as well as known triisocyanates. Examples of suitable polyisocyanates are 2,4-diisocyanatotoluene, 2,6-diisocyanatotoluene (TDI), methylene bis(4-cyclohexyl isocyanate), isophorone diisocyanate, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatodecane, 1,4-diisocyantocylohexane and isomers thereof, 1,10-diisocyanatopropyl)ether of 1,4-butylene glycol, 1,11-diisocyanatoundecane, 1,12-diisocyanatododecane bis(isocyanatohexyl) sulfide, 3,5-diisocyanato-o-xylene, 4,6-diisocyanato-m-xylene, 2,6-diisocyanato-p-xylene, tetramethylxylylene diisocyanate, 2,4-diisocyanato-1-chlorobenzene, 2,4-diisocyanato-1-nitrobenzene, 2,5-diisocyanato-1-nitrobenzene, 2,4' and 4,4'-diphenyl methane diisocyanate (MDI), and derivatives thereof, 3,3-diphenyl-methylene diisocyanate, and polymethylene poly (phenyleneisocyanates) as described in the literature and in many patents, for example, U.S. Pat. Nos. 2,683,730; 2,950,263; 3,012,008; 3,344,162; and 3,362,979, and mixtures thereof.

Additional aromatic polyisocyanates include p-phenylene diisocyanate, dianisidine diisocyanate, bitolylene diisocyanate, naphthalene-1,4-diisocyanate, bis(3-methyl-3-isocyanatophenyl)methane, bis(3-methyl-4-isocyanatophenyl)methane, and 4,4'-diphenylpropane diisocyanate.

The preferred polyisocyanate is toluene diisocyanate (TDI), a mixture of 80% 2,4-tolylene diisocyanate and 20% 2,6-tolylene diisocyanate.

The urethane foaming reaction is usually effected in the presence of a minor amount of a catalyst, preferably an amine catalyst and usually a tertiary amine.

It is also preferred to include a minor amount of certain metal catalysts in addition to the amine catalyst in the components of the reaction mixture. Such supplementary catalysts are well known to the art of polyether-based polyurethane foam manufacture. For example, useful metal catalysts include organic derivatives of tin, particularly tin compounds of octanoic acid.

Any known catalysts useful in producing polyurethane foams may be employed. Representative catalysts include: (a) tertiary amines such as bis(2,2'-dimethylamino)ethyl ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo-[2.2.2]octane, hexamethylenetetramine, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone- alkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_{2++}$, $UO_{2++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2(N,N-dialkylamino)alkanols, such as the well-known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laureate, calcium hexanoate, stannous acetate, stannous octoate, stannous oleate, lead octoate, metallic driers such as manganese and cobalt naphthenate, and the like; and (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylicacids, e.g., dibutyltin diacetate, dibutyltin dilaureate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide) dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

Representative crosslinker examples include but are not limited to: glycol amines; diethanolamine, triethanolamine, monoethanolamine, methyldiethanolamine, isopropanolamine, 2-hydroxyethylpiperazine, aminoethylethanolamine, 2-aminoethanol, Quadrol®, amines; aminoethylpiperazine, p-phenylenediamine, m-phenylenediamine, diisopropanolamine, glycols; sorbitol, ethylene glycol, glycerine.

Blowing agents such as water are typically employed to generate carbon dioxide in situ. Additional blowing agents which are vaporized by the exotherm of the reaction are also commonly employed. Suitable blowing agents, for example, include generally, water from about 0.1 to about 10 weight percent, based upon total weight of polyol or other suitable blowing agents which are vaporized by the exotherm of the reaction, or a combination of water and the other blowing agent. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating such as N,N'-dimethyl-N,N'-dinitrosoterephthalamide, amine formates, formic acid, and the like. The generally preferred method of foaming for producing foams is the use of water, or a combination of water plus a fluorocarbon blowing agent such as trichloromonofluoromethane. The quantity of blowing agent employed will vary with factors such as the density desired in the foamed product.

Other additives may of course be employed to impart specific properties to the foam. Examples are materials such as flame retardants, and Geolite Modifier 90, which allows one to use reduced levels of alternate blowing agents.

The product polyether-based polyurethane foams of this invention may be formed in accordance with any of the processing techniques known to the art, such as, in particular, the "one shot" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol, and catalyst components.

It is to be understood that the relative amounts of the various components of the foam formulation are not narrowly critical. The polyether polyol and polyisocyanate are present in the foam-producing formulation in a major amount. The relative amounts of these two components in the mixture are well known to the art. The blowing agent, catalyst, and surfactant are each present in a minor amount sufficient to foam the reaction mixture. The catalyst is present in a catalytic amount, i.e., that amount necessary to catalyze the reactions to produce the urethane at a reasonable rate, and the surfactant is present in an amount sufficient to impart the properties desired.

In a typical preparation, the polyether polyol, surfactant, amine catalyst, and blowing agent are mixed together, then stannous octoate is added with stirring, and finally toluene diisocyanate is mixed in and the composition is allowed to foam and polymerize.

The foams of the present invention can be used with advantage in the manufacture of textile interliners, cushions, mattresses, padding, carpet underlay, packaging, gaskets, sealers, thermal insulators and the like. They are also advantageously used in flame retardant applications.

DEFINITIONS AND IDENTIFICATIONS OF MATERIALS

The following terms are employed herein as defined below. Various materials are also defined below for the convenience of the reader.

The term breathability refers to the ability of a cured foam to permit passage of a gas such as air therethrough. A "tight" foam has low breathability, while an "open" foam is said to have a high breathability and permits ready passage of gas through it.

The term air flow refers to the volume of air which passes through a 0.5 inch thick 2 inch diameter circular section of foam at 0.5 inches of pressure. A representative commercial unit for measuring air flow is manufactured by Custom Scientific Instruments Inc., of Kearny, N.J. and identified as Nopco CS-145.

The polyethers employed in synthesizing the silicone-polyether copolymers are allyl-started materials which are distributions of various polyether species. The average numbers of alkylene oxide units are indicated by subscripts. The nominal molecular weight is the average m.w. of the species comprising the mixture.

Blend average molecular weight (BAMW) is the weighted average molecular weight of the mixture of polyethers employed in synthesizing the silicone-polyether copolymers, the weighting taking account of the relative amounts of materials in the mixture. The blend average molecular weight is the overall average atomic mass of the polyethers constituting the mixture. The term is also employed herein to refer to the polyethers in the silicon-polyether copolymers.

NIAX® Polyol 16-56 is a proprietary commercial product of the A C West Virginia Polyol Company.

In accordance with generally-accepted usage, the following symbols are defined as shown:

M refers to $(CH_3)_3SiO_{\frac{1}{2}}$;
M' refers to $(H)(CH_3)_2SiO_{\frac{1}{2}}$;
D refers to $(CH_3)_2SiO_{2/2}$;
D' refers to $(H)(CH_3)SiO_{2/2}$; and
D" refers to $R(CH_3)SiO_{2/2}$, where R is a polyether-containing group.

In this terminology, the numerator of the fraction relating to the oxygen atom(s) indicates the number of oxygen atoms attached to the silicon atom of the given unit, and the denominator refers to the number of silicon atoms to which the oxygen atom(s) bond.

The units of the siloxane are sometimes also written in a manner which does not indicate sharing of oxygen atoms, for convenience. For example, D is sometimes shown as $(CH_3)_2SiO$, or $Me_2SiO$. D" is sometimes shown as $R(CH_3)SiO$ or $R(Me)SiO$, and so forth. As indicated above, $CH_3$ is sometimes abbreviated as "Me". Thus, the hypothetical material

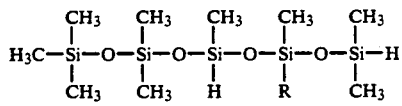

might be written as

Me₃SiO(Me₂)SiO(Me)(H)SiO(Me)(R)SiOSi(Me)₂H or as

When a siloxane contains multiple units of a given type, the average number of these is indicated by a subscript in the formula. Such a subscript does not indicate such units are contiguous, and in fact they are not, except in special circumstances.

L-31 is a polyhydridomethylsiloxane polymer having the general formula $MD'_{45-60}M$.

Toluene diisocyanate (TDI) was a mixture of approximately 80% of the 2,4-isomer and 20% of the 2,6-isomer.

Niax ® Catalyst A-200 is a proprietary product of Union Carbide Chemicals and Plastics Company, Inc.

As employed herein, the term pphp means parts per hundred of polyol.

The term "blowoff" refers to release of gas when foam has reached its full height of rise.

The concept of hydrophil-lipophil balance has been used for a number of years to describe surfactant properties of surface active agents such as ethoxylated linear fatty alcohols. In the present work, a modified version of the hydrophil-lipophil concept has been employed to aid in distinguishing between silicone-rich silicone-polyether copolymers which are useful cell openers, and other silicone-polyether copolymers which contain higher percentages of silicone and which cause instability or even collapse of polyurethane foams.

As employed herein, the lipophilic character (L) of the cell openers is quantified by summing the atomic weights of the lipophilic components of the silicone-polyether copolymer cell openers. In the copolymers, these lipophilic components are the units making up the silicone portion of the molecules, and also the alkylene units which connect the polyether chains to the silicone backbone Thus, for example, the lipophilic portion of the copolymer $MD_{73}D''_{5.1}M$ where $M=Me_3SiO_{\frac{1}{2}}$, $D=Me_2SiO_{2/2}$, and $$D''=\underset{\underset{Me}{|}}{Si}O_{2/2}$$
$$\overset{|}{\underset{}{(CH_2)_3O(C_2H_4O)_{13.1}(C_3H_6O)_{14.9}COCH_3}}$$

would be as follows:

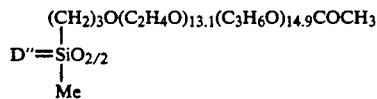

L = 2(Me₃SiO₁/₂) + 73(Me₂SiO₂/₂) + 5.1(MeSiO₂/₂)
L = 2(81) + 73(74) + 5.1(101) = 6079

Calculation of the hydrophilic character of the silicone-polyether copolymer cell openers for purposes of this invention is somewhat different from and more complex than the traditional calculations of hydrophilic character employed by the prior art.

For purposes of this invention, the hydrophilic character of the cell openers is determined by the relatively polar polyether chains and endblocking groups. The variously-situated ethylene oxide units, propylene oxide units, and endblocking groups are arbitrarily considered to make varying contributions to the hydrophilic character of the molecule, these contributions being reflected in various "effectiveness factors" and "effective weights" as discussed below.

The hydrophilic character is therefore estimated by multiplying the atomic weight of each of the various types of ethylene oxide units and propylene oxide units by the number of such units and by the appropriate effectiveness factor, also multiplying the effective weights of each of the various types of endblocking units by the number of such units, and then summing.

The effectiveness factors of the various sorts of hydrophilic units are as follows: for a propylene unit, the factor is 0.2; for an ethylene oxide unit in a block of other ethylene oxide units, the factor is 1; for a polyether having 40% ethylene oxide units and 60% propylene oxide units, randomly distributed, the factor for the ethylene oxide units is estimated as 0.38; ethylene oxide units which are surrounded by large numbers of propylene oxide units are assigned a factor of 0.3. The endblocking units are arbitrarily assigned fixed "effective weights" as follows: For the endblockers —OCOR and —OR the assigned weight is 25 units; for —OH, carbamate (—OCONHR) and carbonate (—OCO₂R) units, the assigned weight is 50 units.

Thus, for example, the hydrophilic character (H) for the hypothetical material $MD_{73}D''_{5.1}M$ discussed immediately above would be calculated as follows:

$$H=5.1[0.38(13.1)(44)+0.2(14.9)(58)+25]=2126$$

For the above hypothetical material, therefore, the ratio $H/L=2126/6079=0.34$.

Alternatively, the polarity of ethylene oxide units in oxyalkylene polymers can be approximated as an "EO effectiveness factor" by use of the equation below:

$$EO\ factor=0.3+0.001048(\%\ EO)+6\times 10^{-7}(\%\ EO)^3$$

Thus, the effectiveness factor for EO in the polyether chains of the hypothetical material $MD_{73}D''5.1M$ above would be estimated as follows: the % EO in the polyether chains of formula $O(C_3H_6O)_{13.1}(C_3H_6O)_{14.9}COCH_3$ is $100\times 576/1499$, or 38.4%. Thus, for each chain the EO effectiveness factor is $0.3+0.001048(38.4)+6\times 10^{-7}(5.6736\times 10^4)=0.374$ and this number would be used in the calculation for H as described above.

It has been found experimentally that cell opener materials having an H/L ratio of about 0.3 or less operate as effective defoamers, and accordingly, such materials are not considered to be within the scope of this invention.

In the following examples and tables, the structures of the silicone fluids $MD_xD'_yM$ are nominal structures. These siloxanes are equilibrium distribution and are actually comprised of a minor amount of cyclic material and predominant amount of linear species. In the syntheses of the surfactants and cell openers, the entire equilibrium distribution was used without removing the more volatile components, though it is possible to remove and recycle these volatiles. One of the endblockers used in these siloxane copolymers is MM, which frequently contains hydrocarbon impurities. The weights of charges employed in the various preparations refer to active components.

Similarly, the polyethers employed in the hydrosilation reactions contain inactive components, primarily polyethers not containing allyl groups. When the blend average molecular weights and amounts of the polyethers are computed, it is necessary to compensate for the amounts of inactive components. In this work, whenever the polyether to be employed contained both ethylene oxide and propylene oxide units, a fixed ratio of ethylene oxide to propylene oxide was used throughout the preparative reaction.

The following examples illustrate the invention, and are not intended to be limiting.

Preparation of $MD_xD'_yM$ Fluids

To a round bottom flask equipped with a glass stirring rod with Teflon blade and an air-driven stirrer motor were charged the desired amounts of hexamethyldisiloxane (MM), octamethylcyclotetrasiloxane ($D_4$), L-31, and 2% by weight based on the total weight of the foregoing reagents of sulfuric acid. The flask was stirred for 24 hours at ambient temperature. The flask contents were then slowly neutralized with an excess of dampened sodium bicarbonate. The product was treated with 0.5 wt % activated carbon and pressure filtered to give a colorless liquid which was characterized by SIH content and viscosity. The charges used for the preparations are shown in Table 1.

TABLE 1

Charges used for Preparation of $MD_xD'_yM$ Fluids

| Product | MM (g) | Cyclic $D_4$ (g) | L-31 (g) |
|---|---|---|---|
| $MD_{65}D'_{7.6}M$ | 2.58 | 88.71 | 8.72 |
| $MD_{73}D'_{5.1}M$ | 2.51 | 92.12 | 5.37 |
| $MD_{75}D'_{12}M$ | 19.67 | 862.86 | 117.55 |
| $MD_{65}D'_{12}M$ | 22.23 | 845.03 | 132.83 |
| $MD_{76}D'_{18.5}M$ | 15.56 | 815.83 | 169.03 |
| $MD_{75}D'_{25}M$ | 12.21 | 769.53 | 218.41 |
| $MD_{65}D'_{25}M$ | 13.60 | 743.18 | 243.38 |
| $MD_{130}D'_{15}M$ | 11.01 | 900.57 | 88.48 |
| $MD_{95}D'_{11.2}M$ | 16.39 | 893.94 | 89.73 |
| $MD_{73}D'_{3}M$ | 26.67 | 940.45 | 32.91 |
| $MD_{97.5}D'_{11.4}M$ | 15.92 | 895.04 | 89.10 |

Preparation of $MD_xD''_yM$ Copolymers

A 500 ml round bottom flask fitted with a glass stirring rod having a Teflon blade with an air-driven stirrer motor were charged with the desired polyether or blend of polyethers (using a 30 mole % excess), $MD_xD'_yM$ fluid, and 0.1 wt % sodium propionate (based on polyether charge). The flask was equipped with a thermometer, condenser, and a nitrogen sparge tube. The mixture was heated to about 80° C. with a slow nitrogen sparge and then an ethanol solution of chloroplatinic acid (10 mg. Pt/ml.) was added. An exotherm of several degrees and a change from "cloudy" to "clear" were noted. After about one-half hour a sample of this material showed no residual SIH as determined by reaction with an ethanol solution of KOH in a fermentation tube. The material was then neutralized with sodium bicarbonate, then pressure filtered.

The procedures used to prepare the copolymers of this invention have been standardized and the extent of side reactions defined for various combinations of reactants. $^{29}$Si NMR has shown that 1. Hydrosilation of the allyl polyethers is the dominant reaction. Propenyl ethers do not hydrosilate.
2. Small amounts of $MeSiO_{3/2}$ units are seen, suggesting that proton donors such as water and alcohol are reacting with the SiH units to produce hydrogen.
3. The siloxane chains are essentially preserved.
4. There is essentially no migration or exchange of SiH and Si—O—Si units.

The silicone-polyether copolymers employed in this work were prepared in the manner described above. Examples of the reagents and the amounts used in the preparation of two cell openers and two primary surfactants are shown below in Table 2. The other materials shown in Tables A-F below were prepared in the same manner, using appropriate amounts of the required reagents, which will be apparent to those skilled in the art.

TABLE 2

Charges used for Preparation of $MD_xD''_yM$ Copolymers

| Run # | Structure | gm SIH Fluid | gms Used | BAMW | USED |
|---|---|---|---|---|---|
| A. Cell Openers | | | | | |
| 1 | $MD_{65}D''_{7.6}M$ | 92.2 | 100 | — | P-1 |
| 2 | $MD_{65}D''_{7.6}M$ | 135.6 | 100 | — | P-4 |
| B. Primary Surfactants | | | | | |
| 1 | $MD_{65}D''_{7.6}M$ | 52.8 | 197.6 | 2300 | P-1, P-2, P-3 |
| 2 | $MD_{65}D''_{7.6}M$ | 55.5 | 194.6 | 1600 | P-1, P-3 | a) The polyethers employed herein were as follows:
P-1 = —$(CH_2)_3O(C_2H_4O)_{11.2}COCH_3$
P-2 = —$(CH_2)_3O(C_2H_4O)_{13}(C_3H_6O)_{15}COCH_3$
P-3 = —$(CH_2)_3O(C_2H_4O)_{36}(C_3H_6O)_{41}COCH_3$
P-4 = —$(CH_2)_3O(C_2H_4O)_{6.6}COCH_3$ The surfactants and cell openers were evaluated in the polyurethane foam formulation shown below in Table 3.

TABLE 3

Polyurethane Foam Test Formulation

| Material | pphp (wt.) |
|---|---|
| NIAX ® Polyol 16-56 | 100 |
| Distilled water | 5.5 |
| NIAX ® Catalyst A-200 | 0.2 |
| Methylene chloride | 10.0 |
| Stannous octoate | 0.23 |
| Toluene diisocyanate(TDI)$^a$ | 69.44 |
| Surfactant | varied |

Footnote for Table 3:
$^a$The TDI was employed at a level of 112 percent of the stoichiometric amount.

Procedure for Preparation and Testing of Polyurethane Foams

The temperature of the laboratory, the polyol and TDI were noted. A 32 oz. paper cup was charged with MIAX Polyol 16-56 (250 g), the surfactant to be evaluated, amine/water premix (containing 13.75 g of water and 0.5 g of MIAX Catalyst A-200), and methylene chloride (25 g). The mixture was stirred for 15 seconds, then stirring was stopped. After 20 seconds total elapsed time stannous octoate (0.575 g, 0.46 ml) was added to the reaction mixture. Stirring was started and the mixture was stirred for 8 seconds before adding 80/20 toluene diisocyanate (173.6 g, 112% of the stoichiometric amount) with continuous stirring for an additional seven seconds. The stirrer was then stopped and the reaction mixture was dumped into a five gallon plastic bucket. The maximum height of the foam at blowoff, the amount of top collapse at constant rise on the strip chart via an ultrasonic depth monitor, and the rise time were recorded. The foam was then cured. A core sample was cut from the center of the foam. The core sample was sliced into ¼ inch thick specimens. The specimen between 3.5 and 4.0 inches was used to determine the breathability (airflow volume through a 2-inch diameter circular cross section at 0.5 inches pressure). Foam height was defined as the resulting height of the foam after the initial top collapse.

Discussion of Tables A–F

Table A below shows the effect of varying the amount of polyether in the cell opener materials. The primary surfactant gives a well stabilized foam having a good height of rise and moderately low air flow. When cell opener materials having a lower percentage of polyether than the primary surfactant were used in conjunction with theprimary surfactant, air flow of the resulting foams increased substantially for mixtures containing cell openers having from about 42 to about 59 percent polyether. This was also true for the two cell openers having percent polyether greater than 60%, provided that the mixture of primary surfactant and cell opener was employed at a high enough level in the foam composition. It will be noted that as the percent polyether in the cell opener approaches that of the primary surfactant, the effect of the cell opener in combination with the primary surfactant becomes less.

Table B below shows the effect of varying the amount of cell opener relative to primary surfactant. It is seen that as the weight percent of cell opener in the mixture of primary surfactant plus cell opener is increased, the air flow of the resulting foam increases dramatically. This is true whether the concentration of primary surfactant plus cell opener in the foam composition is 0.5 pphp or a higher level, namely 1.4 pphp. It is also seen that when the weight percent of cell opener in the mixture of primary surfactant plus cell opener is 5% or greater, the air flow remains nearly constant regardless of the level of primary surfactant pluscell opener employed in the foam composition, at least until the highest cell opener level reported, which is apparently too high. It is to be noted also that the heights of rise of the foams were not substantially affected by the presence of cell opener, while the air flows were improved dramatically.

Table C below shows the effect of varying the molecular weight of the polyether used in making the cell opener. It is seen that silicone-polyether copolymers which are very silicone-rich do not function as cell openers and instead cause collapse of the foam. In this regard, see the short chain polyether employed in the first "cell opener" material listed, which material had an H/L ratio of 0.21 which is below the ratio of 0.3 defining the lower limit of H/L of the cell opener of this invention. Cell opener materials having an average of 6.6 ethylene oxide units in the polyether were not effective with this primary surfactant at low levels the foam composition and were only marginally effective when the amount of primary surfactant plus cell opener was raised to 1.40 pphp in the foam composition. The cell opener material having an average of 11.2 ethylene oxide units in the polyether, when employed at levels of 5% cell opener in the primary surfactant, exhibited good cell opener function. Note that the air flows of the resulting foams increase dramatically as the level of cell opener is increased from 5% to 15% in the blend of primary surfactant and cell opener. The cell opener material having an average of 15.7 ethylene oxide units in the polyether proved to be ineffective or detrimental to the performance of the primary surfactant in this instance. This is not to imply, however, that blends of low molecular weight polyethers could not be used with the polyether containing an average of 15.7 ethylene oxide units to make functional cell opener materials.

Table D below shows the performance of various combinations of primary surfactants and cell opener materials. The combinations of primary surfactant and cell opener are not optimized. Table D illustrates 4 fundamentally different primary silicone surfactants blended with a variety of cell opener materials. In some cases the presence of cell opener in combination with primary surfactant caused dramatically increased air flows without substantially effecting height of rise of the foam. See, for example, the first two sheets of Table D. In other cases, the effect of the added cell opener material was more modest but nevertheless real. See, for example, the third and fourth pages of Table D. Typically the polyether content of the cell opener material illustrated in Table D was 10% to 20% lower than that of the primary surfactant with which it was tested.

Table E below shows the performance of silicone-polyether copolymers having low H/L ratios. It is seen that when the H/L ratio is below about 0.3 the silicone-polyether copolymers do not function as cell openers (at least with the primary surfactant employed in this trial), but instead operate as defoamers and cause cell collapse. The excessively silicone-rich silicone-polyether copolymers of this trial were prepared using a number of different approaches. In one case the number of polyether graft sites was reduced, but a polyether having 11.2 ethylene oxide units per chain on average (which had been shown to be very effective in other materials) was employed for the polyether portion of the molecule. In another case, the number of polyether graft sites was not reduced relative to the number in the primary surfactant, but the molecular weight of the polyether was lowered. In this regard see the polyether group shown in footnote b. In a third case, the polarity of the polyether groups used in preparing the copolymer was reduced by the introduction of propylene oxide units. In this regard see footnote d. Despite the rather substantial variations in structures of the trial silicone-polyether copolymers, it appears that so long as the ratio of H to L is below about 0.3, these materials will not function satisfactorily as cell openers.

Table F below shows the effectiveness of cell opener materials whose silicone portions are of different molecular weight. It is seen in each casethat increasing the molecular weight of the silicone portion of the molecule while keeping the degree of substitution of polyether the same causes an increase in the air flow of the resulting foam. For the case in which the composition of primary surfactant and cell opener was employed at a level of 1.4 pphp in the foam, and the cell opener contained the lower molecular weight polyether, the improvement in air flow was quite dramatic. The air flow in this instance was also higher at the higher level of surfactant than it was at the lower level, a result which was quite unexpected. Normally, when the amount of surfactant in a foam composition is increased, the air flow of the resulting foam decreases.

TABLE A

Effect of Varying the amount of the Polyether in the Cell Openers

| | | | at 0.70 pphp | | at 1.26 pphp | |
|---|---|---|---|---|---|---|
| | | | Rise | AF | Rise | AF |
| Primary Surfactant[a] | | % Polyether in Primary Surfactant Structure | Primary Surfactant Foam Performance | | | |
| $MD_{65}D''_{7.6}M$ | | 74.9[d] | 40.3 | 1.5 | 40.7 | 1.0 |
| Cell Opener Structure[c] | H/L[b] | % Polyether in Cell Opener | Primary Surfactant (95%) with 5% Cell Opener | | | |
| $MD_{65}D''_{7.6}M$ | .68 | 42.2 | 39.0 | 2.3 | 41.4 | 2.0 |
| $MD_{75}D''_{12}M$ | .90 | 48.9 | 40.5 | 2.5 | 41.7 | 2.4 |
| $MD_{65}D''_{12}M$ | 1.0 | 51.7 | 40.0 | 1.6 | 41.0 | 1.6 |
| $MD_{70}D''_{18.5}M$ | 1.3 | 58.6 | 40.6 | 1.8 | 41.5 | 1.6 |
| $MD_{75}D''_{25}M$ | 1.6 | 62.6 | 40.0 | 1.5 | 41.2 | 1.5 |
| $MD_{65}D''_{25}M$ | 1.7 | 64.8 | 38.4 | 1.5 | 39.5 | 1.3 |

[a]In the Primary surfactant the R group of D'' was a blend of 2 polyethers: $-(CH_2)_3O(C_2H_4O)_xCOCH_3$ of m.w.590, and $-(CH_2)_3O(C_2H_4O)_x(C_3H_6O)_yCOCH_3$ with 40% $C_2H_4O$ and m.w. ca. 4000. The blend average m.w. of the combined polyethers was 2300.
[b]Ratio of hydrophil to lipophil
[c]In the D'' unit of all the cell openers in this set the R group was $-(CH_2)_3O(C_2H_4O)_{11.2}COCH_3$
[d]% polyether in surfactant = $\frac{\text{wt polyether}}{(\text{wt polyether} + \text{wt lipophil})} \times 100$

TABLE B

Effect of Varying the Amount of Cell Opener Relative to Primary Surfactant[a]

| | Total Surfactant Concentration | | | |
|---|---|---|---|---|
| Wt % Cell Opener | 0.50 pphp | | 1.40 pphp | |
| in Surfactant Blend | Rise | AF | Rise | AF |
| 0 (Control) | 36.4 | 2.9 | 38.0 | 3.3 |
| 2.5 | 38.5 | 3.2 | 39.9 | 2.3 |
| 5.0 | 38.7 | 3.5 | 39.8 | 3.4 |
| 10.0 | 37.7 | 5.7 | 39.3 | 5.5 |
| 15.0 | 37.8 | 6.6 | 39.7 | 7.5 |
| 20.0 | 36.0 | 7.9 | 37.0 | 7.4 |
| 25.0 | 37.3 | 4.5[c] | 37.3 | 9.1 |

[a]The primary surfactant was $MD_{65}D''_{7.6}M$ prepared with a blend of two polyethers, $-(CH_2)_3O(C_2H_4O)_{11.2}COCH_3$ and $-(CH_2)_3O(C_2H_4O)_x(C_3H_6O)_yCOCH_3$ with 40% $C_2H_4O$ and m.w. ca 4000, with a polyether blend average m.w. of 1600.
[b]Cell opener was $MD_{65}D''_{7.6}M$ in which the R group of D'' was $-(CH_2)_3O(C_2H_4O)_{11.2}COCH_3$
[c]This excessively high level of cell opener caused poor cell structure which frequently causes a drop in air flow.

TABLE C

Effect of Varying the Molecular Weight of the Polyether Used to Make the Cell Opener

| | | | Primary Surfactant[a] with Polyether Blend Avg. M.W. 1650 | | | | Primary Surfactant[a] with Polyether Blend Avg. M.W. 1600 | | | |
|---|---|---|---|---|---|---|---|---|---|---|
| | C.O. Wt % in Surf. | H/L[b] | 0.50 pphp Total Surf. | | 1.40 pphp Total Surf. | | 0.50 pphp Total Surf. | | 1.40 pphp Total Surf. | |
| | | | Rise | AF | Rise | AF | Rise | AF | Rise | AF |
| Primary Surfactant[a] | 0 | — | 37.8 | 3.0 | 40.2 | 2.1 | 37.3 | 3.1 | 39.2 | 2.2 |
| Cell Opener[c] | | | | | | | | | | |
| Polyether | | | | | | | | | | |
| $-(CH_2)_3(OC_2H_4)_3OMe$ | 0.5 | .21 | Collapse | | 32.8 | 5.3** | — | — | — | — |
| | 1.0 | | Collapse | | Collapse | | | | | |
| $-(CH_2)_3(OC_2H_4)_{6.6}OCOCH_3$ | 1.5 | .42 | 36.7 | 2.1 | 38.0 | 3.1 | — | — | — | — |
| | 2.5 | | 36.6 | 2.7 | 37.8 | 3.8 | — | — | — | — |
| $-(CH_2)_3(OC_2H_4)_{11.2}OCOCH_3$ | 2.5 | .68 | 39.2 | 2.7 | 40.8 | 2.3 | 38.5 | 3.2 | 39.9 | 2.3 |
| | 5.0 | | 38.8 | 3.7 | 40.6 | 2.6 | 38.7 | 3.5 | 39.8 | 3.4 |
| | 10.0 | | 37.4 | 4.6 | 38.9 | 4.7 | 37.7 | 5.7 | 39.3 | 5.5 |
| | 15.0 | | 37.5 | 5.7 | 38.2 | 7.0 | 37.8 | 6.6 | 39.7 | 7.5 |
| $-(CH_2)_3(OC_2H_4)_{15.7}OCOCH_3$ | 0.1 | .95 | 37.8 | 2.2 | 39.6 | 2.2 | | | | |
| | 1.0 | | 37.4 | 1.7** | 39.3 | 1.6 | | | | |

[a]Primary surfactant was $MD_{65}D''_{7.6}M$ prepared with a blend of 2 polyethers, $-(CH_2)_3O(C_2H_4O)_{11.2}COCH_3$ and $-(CH_2)_3O(C_2H_4O)_x(C_3H_6O)_yCOCH_3$ with 40% $C_2H_4O$ and M.W. ca 4000.
[b]Hydrophil/Lipophil ratio
[c]The siloxane backbone for all the cell openers was $MD_{65}D''_{7.6}M$ and the polyether listed was used as R in the D'' units.
**Cell structure adversely affected.

TABLE D

Various Combinations of Primary Surfactants and Cell Openers

| | | at 0.5 pphp | | at 1.4 pphp | |
|---|---|---|---|---|---|
| | | Rise | AF | Rise | AF |
| Primary Surfactant[a] | % Polyether in Primary Surf. Structure | Primary Surfactant Foam Performance | | | |
| $MD_{65}D''_{2.9}D'''_{3.2}D^{IV}_{1.5}M$ | 68.5 | 39.3 | 3.6 | 40.8 | 2.6 |
| | | Primary Surfactant (95%) | | | |

TABLE D-continued

Various Combinations of Primary Surfactants and Cell Openers

| Cell Opener Structure | % Polyether in Cell Opener Structure | with 5% Cell Opener Surfactant Blend-Foam Performance | | | |
|---|---|---|---|---|---|
| | | at 0.5 pphp | | at 1.4 pphp | |
| | | Rise | AF | Rise | AF |
| $MD_{65}D''_{7.6}M$ | 42.2 | 39.4 | 6.8 | 41.4 | 5.9 |

| Primary Surfactant[b] | % Polyether in Primary Surf. Structure | Primary Surfactant Foam Performance | | | |
|---|---|---|---|---|---|
| $MD_{65}D''_{7.6}M$ | 76.9 | 35.5 | 2.5 | 38.9 | 2.0 |

| Cell Opener Structure[c] | % Polyether in Cell Opener Structure | Primary Surfactant (95%) with 5% Cell Opener Surfactant Blend-Foam Performance | | | |
|---|---|---|---|---|---|
| $MD_{73}D''_{5.1}M$ | 56 | 35.6 | 4.1 | 37.4 | 3.1 |

| Primary Surfactant[d] | % Polyether in Primary Surf. Structure | Primary Surfactant Foam Performance | | | |
|---|---|---|---|---|---|
| $MD_{73}D''_{5.1}M$ | 66.5 | 36.9 | 5.3 | 39.2 | 2.5 |

| Cell Opener Structure | % Polyether in Cell Opener Structure | Primary Surfactant (95%) with 5% Cell Opener Surfactant Blend-Foam Performance | | | |
|---|---|---|---|---|---|
| $MD_{65}D''_{7.6}M^e$ | 42.2 | 37.6 | 7.3 | 41.0 | 3.2 |
| $MD_{73}D''_{5.1}M^f$ | 56 | 37.4 | 7.0 | 39.5 | 2.8 |

| Primary Surfactant | % Polyether in Primary Surf. Structure | Primary Surfactant Foam Performance | | | |
|---|---|---|---|---|---|
| $MD_{73}D''_{5.1}M^g$ | 57.6 | 37.4 | 7.2 | 39.8 | 2.1 |

| Cell Opener Structure | % Cell Opener in Surfactant Blend | % Polyether in Cell Opener Structure | Primary Surfactant Blended with Different Levels of Cell Opener Surfactant Blend-Foam Performance | | | |
|---|---|---|---|---|---|---|
| $MD_{65}D''_{7.6}M^h$ | 2.5 | 32.8 | 37.2 | 7.5 | 39.5 | 2.7 |
| | 5.0 | | 36.4 | 7.9 | 39.2 | 3.6 |

[a] In the above primary surfactant and cell opener, $D'' = (CH_2)_3(OC_2H_4)_{11.2}OAc$
         |
       $SiO_{2/2}$
         |
        Me $D''' = (CH_2)_3(OC_2H_4)_{13}(OC_3H_6)_{15}OAc$ and $D^{IV} = (CH_2)_3(OC_2H_4)_{36}(OC_3H_6)_{41}OAc$
         |                                                          |
       $SiO_{2/2}$                                               $SiO_{2/2}$
         |                                                          |
        Me                                                         Me

[b] In the primary surfactant the R group of D'' represents two polyethers $-(CH_2)_3(OC_2H_4)_{13}(OC_3H_6)_{15}OAc$ and $-(CH_2)_3(OC_2H_4)_{36}(OC_3H_6)_{40}OAc$ where the blend average m.w. of the two polyethers is 2500.
[c] In the cell opener, the R group of D'' was $-(CH_2)_3(OC_2H_4)_{13}(OC_3H_6)_{15}OAc$
[d] In the primary surfactant the R group of D'' was a blend of 2 polyethers, $-(CH_2)_3(OC_2H_4)_{13}(OC_3H_6)_{15}COCH_3$ and $-(CH_2)_3O(C_2H_4O)_{36}(C_3H_6O)_{41}COCH_3$ at a blend average m.w. of 2350.
[e] In this cell opener the R group of D'' was $-(CH_2)_3O(C_2H_4O)_{11.2}COCH_3$
[f] In this cell opener, the R group of D'' was $-(CH_2)_3O(C_2H_4O)_{13}(C_3H_6O)_{15}COCH_3$
[g] In this primary surfactant the group R of D'' was a blend of 2 polyethers, $-(CH_2)_3O(C_2H_4O)_{11.2}COCH_3$ and $-(CH_2)_3O(C_2H_4O)_{36}(C_3H_6O)_{41}COCH_3$, at a blend average m.w. of 1600.
[h] In this cell opener the group R of D'' was $-(CH_2)_3O(C_2H_4O)_{6.6}COCH_3$

TABLE E

Copolymers with Low H/L Values

| | Primary Surfactant Foam Performance | | | |
|---|---|---|---|---|
| | at 0.5 pphp | | at 1.4 pphp | |
| Primary Surfactant | Rise | AF | Rise | AF |
| $MD_{65}D''_{7.6}M^a$ | 37.3 | 3.1 | 39.2 | 2.2 |

| Secondary Copolymer | H/L[e] | Foam Evaluation of 95% Good Primary Surfactant plus 5% "Low H/L" Copolymer |
|---|---|---|
| $MD_{130}D''_{15}M^b$ | 0.21 | Collapse |
| $MD_{95}D''_{11.2}M^b$ | 0.21 | Collapse |
| $MD_{65}D''_{7.6}M^b$ | 0.21 | Collapse |
| $MD_{73}D''_3M^c$ | 0.26 | Collapse |
| $MD_{130}D''_{15}M^d$ | 0.23 | Collapse |

[a] The primary surfactant employed for the R group in D'' a blend of polyethers, $-(CH_2)_3O(C_2H_4O)_{11.2}COCH_3$ and $-(CH_2)_3O(C_2H_4O)_{36}(C_3H_6O)_{41}COCH_3$ at a blend average MW of 1600.
[b] The R group of D'' was $-(CH_2)_3O(C_2H_4O)_3CH_3$
[c] The R group of D'' was $-(CH_2)_3O(C_2H_4O)_{11.2}COCH_3$
[d] The R group of D'' was $-(CH_2)_3O(C_2H_4O)_{4.5}(C_3H_6O)_{5.1}COCH_3$
[e] H/L is hydrophil/lipophil

TABLE F

Cell Openers of Different Molecular Weights at Constant D/D'' Ratios

| | Primary Surfactant Foam Performance | | | |
|---|---|---|---|---|
| | at 0.5 pphp | | at 1.4 pphp | |
| Primary Surfactant | Rise | AF | Rise | AF |
| $MD_{65}D''_{7.6}M^a$ | 37.3 | 3.1 | 39.2 | 2.2 |

Primary Surfactant (95%) with 5% Cell Opener

TABLE F-continued

| | Surfactant Blend - Foam Performance | | | |
|---|---|---|---|---|
| | at 0.5 pphp | | at 1.4 pphp | |
| Cell Opener | Rise | AF | Rise | AF |
| $M[D_{65}''D''_{7.6}]M^b$ | 37.5 | 4.6 | 38.3 | 4.6 |
| $M[D_{65}''D''_{7.6}]_{1.5}M^b$ | 38.4 | 4.7 | 38.6 | 7.3 |
| $M[D_{65}''D''_{7.6}]M^c$ | 38.7 | 3.5 | 39.8 | 3.4 |
| $M[D_{65}''D''_{7.6}]_{1.5}M^c$ | 38.4 | 4.4 | 39.6 | 3.8 |

[a] The primary surfactant employed for the R group in D" a blend of polyethers, $-(CH_2)_3O(C_2H_4O)_{11.2}COCH_3$ and $-(CH_2)_3O(C_2H_4O)_{36}(C_3H_6O)_{41}COCH_3$ at a blend average MW of 1600.
[b] In these cell openers the group R of D" was $-(CH_2)_3O(C_2H_4O)_{6.6}COCH_3$
[c] In these cell openers the group R of D" was $-(CH_2)_3O(C_2H_4O)_{11.2}COCH_3$ In addition to the example of cell openers discussed above, many other cell opener materials are within the scope of the invention. A few of these are listed in Table G below to provide further illustrations of the compounds of the invention. These and other similar materials would be prepared by procedures known to the art such as those illustrated in connection with the examples discussed above.

TABLE G

ADDITIONAL EXAMPLES OF CELL OPENERS a) $CH_3CO_2(C_2H_4O)_{12}C_3H_6Me_2Si(OSiMe_2)_{70}(OSi)_R{}^{Me}{}_5C_3H_6O(C_2H_4O)_{12}COCH_3$
where $R = CH_3CO_2(C_2H_4O)_{12}C_3H_6-$
b) $(Me_3SiO_{\frac{1}{2}})_5(Me_2SiO)_{65}(MeSiO_{3/2})_3(MeRSiO)_7$
where $R = CH_3CO_2(C_2H_4O)_{12}C_3H_6-$
c) $Me_3SiO(Me_2SiO)_{65}(MeR^5SiO)_4(MeRSiO)_6SiMe_3$
where $R^5 = C_8H_{17}-$ and $R = CH_3CO_2(C_2H_4O)_{12}C_3H_6-$
d) $Me_3SiO(Me_2SiO)_{70}(MeR^6SiO)_8SiMe_3$
where $R^6 = -C_3H_6(OC_2H_4)_{14}OCOC_{17}H_{35}$
e) $Me_3SiO(Me_2SiO)_{65}(MeR^7SiO)_8SiMe_3$
where $R^7 = C_3H_6O(C_2H_4O)_9CONHCH_3$
f) $Me_3SiO(Me_2SiO)_{65}(MeR^8SiO)_7SiMe_3$
where $R^8 = -C_3H_6(OC_2H_4)_{10}OC_2H_4CN$
g) $Me_3SiO(Me_2SiO)_{65}(MeR^9SiO)_2(MeR^{10}SiO)_8SiMe_3$
where $R^9 = -C_3H_6(OC_2H_4)_6OH$, and $R^{10} = -C_3H_6(OC_2H_4)_{12}OCOCH_3$
h) $Me_3SiO(Me_2SiO)_{65}(MeRSiO)_8SiMe_3$
where $R = -C_3H_6(OC_3H_6)_5(OC_2H_4)_{14}OCOCH_3$
blocked blocked Similarly, in Table H below are listed a number of additional examples of primary surfactants which could be employed in conjunction with the cell openers of the invention. These would also be synthesized by the generally-employed techniques discussed and exemplified above, or for "hydrolyzable" surfactants which are well known in the art.

TABLE H

ADDITIONAL EXAMPLES OF
PRIMARY SURFACTANTS WHICH
COULD BE USED WITH THIS INVENTION a) $Me_3SiO(Me_2SiO)_{60}[(Me)\phi C_2H_4SiO]_5(MeRSiO)_8SiMe_3$
where R = a blend of P-1 and P-3 polyethers as defined in Footnote "a" of Table 2, with a blend average molecular weight of 1400, and $\phi$ signifies phenyl.
b) $RMe_2SiO(Me_2SiO)_{65}(MeRSiO)_5SiMe_2R$
where R is a blend of polyethers P-1 and P-3 as defined in Footnote "a" of Table 2, having a blend average molecular weight of 1400.
c) $(Me_3SiO_{\frac{1}{2}})_6(Me_2SiO)_{70}(MeSiO_{3/2})_4(MeRSiO)_8$
where R = blend of polyethers P-1 and P-3 as defined in Footnote "A" of Table 2, with a blend average molecular weight of 1300.
d) $(RO)_{3.2}(Me_2SiO)_{20}(MeSiO_{3/2})_{1.2}$
where R is a blend of $-(C_3H_6O)_{1.5}(C_2H_4O)_{10}C_4H_9$ (where the $C_2H_4O$ units are in a block) and $-(C_2H_4O)_{28}(C_3H_6O)_{32}C_4H_9$
with a blend average molecular weight of 1400. This would represent a typical hydrolyzable surfactant structure.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A composition, comprising:
a first silicone polyether copolymer in which the copolymer backbone possesses at least 20 Si—O—Si linkages, more than 50% of the Si atoms carry at least two methyl groups, and the sum of the atomic masses of the oxyethylene units and the oxypropylene units constitute at least 50% of the average molecular weight of the copolymer; and
a second silicone polyether copolymer, said second polyether copolymer having the generalized formula $(Me_3SiO_{\frac{1}{2}})_\alpha(Me_2SiO_{2/2})_\beta(MeSiO_{3/2})_\gamma(RMeSiO_{2/2})_\delta(R^5MeSiO_{2/2})_\epsilon(RMe_2SiO_{\frac{1}{2}})_\zeta$ wherein
$\alpha + \zeta = \gamma + 2$;
$\alpha = 0$ to $\gamma + 2$;
$\beta = 10$ to $180$;
$\gamma = 0$ to $15$;
$\delta = 1$ to $40$;
$\epsilon = 0$ to $20$;
$\zeta = 0$ to $\gamma + 2$;
$\delta + \zeta \geq 2$;
$\Sigma(\alpha + \beta + \gamma + \epsilon + \zeta) \geq 20 \leq 200$; and
R is a polyether of formula $-(CHR')_nO(C_2H_4O)_x(C_2H_3R''O)_zQ$ or a mixture thereof, wherein
n is 2 to 10;
x + z = 5 to 40;

and with the proviso that
when z=0, $x \leq 18$; and wherein
R' is H, alkyl of 1 to 3 carbon atoms, phenyl, or alkyl-substituted phenyl in which the alkyl substituents contain 1 to 2 carbon atoms, and where there are several R' groups, these may be the same or different;

R" is alkyl of 1 to 18 carbon atoms, phenyl, or alkyl-substituted phenyl in which the alkyl substituents contain 1 to 4 carbon atoms;

Q is selected from the group consisting of:
H;
alkyl of 1 to 18 carbon atoms;
benzyl;
alkyl-substituted benzyl in which the alkyl substituents contain 1 to 4 carbon atoms;
$CO_2R^2$ in which $R^2$ is alkyl of 1 to 2 carbon atoms;
$CONHR^3$ in which $R^3$ in alkyl of 1 to 3 carbon atoms, phenyl, or alkyl-substituted phenyl in which the alkyl substituents contain 1 to 4 carbon atoms;
$COR^4$ in which $R^4$ is alkyl of 1 to 18 carbon atoms, phenyl, or alkyl-substituted phenyl in which the alkyl substituents contain 1 to 4 carbon atoms; atoms,
$R^5$ is alkyl of 2 to 18 carbon atoms, phenyl, phenyl-substitued alkyl of 2 to 3 carbon atoms, or cyano- or fluoro-substituted alkyl of 2 to 18 carbon atoms;

the ratio of hydrophilic character to lipophilic character for the second silicon polyether copolymer being $\geq 0.3$;

the weight % of polyether groups in said second silicon polyether copolymers being at least 5% less than the weight % of polyether groups in said first silicone polyether copolymer; and said second silicone polyether copolymer constituting from about 0.05% to about 40% of the sum of said first and second silicone polyether copolymers.

2. The composition of claim 1 wherein in said second silicone polyether copolymer $\gamma=0$, $\epsilon=0$, $\Sigma(\alpha+\beta+\delta+\zeta) \geq 45 \leq 160$, and the ratio $x/(x+z)$ is $\geq 0.7$.

3. The composition of claim 2 wherein in said second silicone polyether copolymer z in substituent R is 0, and x in substituent R is 6 to 14.

4. The composition of claim 1 wherein in said second silicone polyether copolymer $\gamma=0$, $\epsilon=0$, $\zeta=0$, $\delta=4$ to 40, $\Sigma(\alpha+\beta+\zeta) \geq 60 \leq 135$, and the ratio $x/(x+z)$ is $\geq 0.7$.

5. The composition of claim 4 wherein in said second silicone polyether copolymer z in substituent R is 0, and x in substituent R is 6 to 14.

6. A polyurethane foam composition comprising:
(a) a polyether polyol containing an average of more than 2 hydroxyl groups per molecule;
(b) an organic diisocyanate;
(c) at least one catalyst for production of polyurethane foam;
(d) a blowing agent;
(e) a surfactant comprising:
a first silicone polyether copolymer in which the copolymer backbone possesses at least 20 Si—O—Si linkages, more than 50% of the Si atoms carry at least two methyl groups, and the sum of the atomic masses of the oxyethylene units and the oxypropylene units constitute at least 50% of the average molecular weight of the copolymer; and
(f) a second silicone polyether copolymer, said second silicone polyether copolymer having the generalized formula $(Me_3SiO_{\frac{1}{2}})_\alpha(Me_2SiO_{2/2})_\beta(MeSiO_{3/2})_\gamma(RMeSiO_{2/2})_\delta(R^5MeSiO_{2/2})_\epsilon(RMe_2SiO_{\frac{1}{2}})_\zeta$ wherein
$\alpha+\zeta=\gamma+2$;
$\alpha=0$ to $\gamma+2$;
$\beta=10$ to 180;
$\gamma=0$ to 15;
$\delta=1$ to 40;
$\epsilon=0$ to 20;
$\zeta=0$ to $\gamma+2$;
$\delta+\zeta \geq 2$;
$\Sigma(\alpha+\beta+\gamma+\epsilon+\zeta) \geq 20 \leq 200$; and
R is a polyether of formula $-(CHR')_nO(C_2H_4O)_x(C_2H_3R"O)_zQ$ or a mixture thereof, wherein
n is 2 to 10;
x+z=5 to 40;

$$\frac{x}{x+z} \geq 0.4;$$

and with the proviso that when $z=0$, $x \leq 18$; and wherein
R' is H, alkyl of 1 to 3 carbon atoms, phenyl, or alkyl-substituted phenyl in which the alkyl substituents contain 1 to 2 carbon atoms, and where there are several R' groups, these may be the same or different;
R" is alkyl of 1 to 18 carbon atoms, phenyl, or alkyl-substituted phenyl in which the alkyl substituents contain 1 to 4 carbon atoms;

Q is selected from the group consisting of.
H;
alkyl of 1 to 18 carbon atoms;
benzyl;
alkyl-substituted benzyl in which the alkyl substituents contain 1 to 4 carbon atoms;
$CO_2R^2$ in which $R^2$ is alkyl of 1 to 2 carbon atoms;
$CONHR^3$ in which $R^3$ in alkyl of 1 to 3 carbon atoms, phenyl, or alkyl-substituted phenyl in which the alkyl substituents contain 1 to 4 carbon atoms;
$COR^4$ in which $R^4$ is alkyl of 1 to 18 carbon atoms, phenyl, or alkyl-substituted phenyl in which the alkyl substituents contain 1 to 4 carbon atoms; and
$R^5$ is alkyl of 2 to 18 carbon atoms, phenyl, phenyl-substituted alkyl of 2 to 3 carbon atoms, or cyano- or fluoro-substituted alkyl of 2 to carbon atoms;

the ratio of hydrophilic character to lipophilic character for the second silicon polyether copolymer being $\geq 0.3$;

the weight % of polyether groups in said second silicon polyether copolymers being at least 5% less than the weight % of polyether groups in said first silicone polyether copolymer; and said second silicone polyether copolymer constituting from about 0.05% to about 40% of the sum of said first and second silicone polyether copolymers.

7. The polyurethane foam composition of claim 6, wherein in said second silicone polyether copolymer $\gamma=0$, $\epsilon=0$, $\Sigma(\alpha+\beta+\delta+\zeta)\geq 45\leq 160$, and the ratio $x/(x+z)$ is $\geq 0.7$.

8. The polyurethane foam composition of claim 7, wherein in said second silicone polyether copolymer z in substituent R is 0, and x in substituent R is 6 to 14.

9. The polyurethane foam composition of claim 6, wherein in said second silicone polymer copolymer $\gamma=0$, $\epsilon=0$, $\zeta=0$, $\delta=4$ to 40, $\Sigma(\alpha+\beta+\zeta)\geq 60\leq 135$, and the ratio $x/(x+z)$ is $\geq 0.7$.

10. The polyurethane foam composition of claim 9, wherein in said second silicone polymer copolymer z in substituent R is 0, and x in substituent R is 6 to 14.

11. A method of preparing polyurethane foam, which comprises the steps of:
1) preparing a mixture comprising:
   a) a polyether polyol containing an average of more than 2 hydroxyl groups per molecule;
   b) an organic diisocyanate;
   c) at least one catalyst for production of polyurethane foam;
   d) a blowing agent;
   e) a surfactant comprising:
      a first silicone polyether copolymer in which the copolymer backbone possesses at least 20 Si—O—Si linkages, more than 50% of the Si atoms carry at least two methyl groups, and the sum of the atomic masses of the oxyethylene units and the oxypropylene units constitute at least 50% of the average molecular weight of the copolymer; and
   f) a second silicone polyether copolymer, said second silicone polyether copolymer having the generalized formula $(Me_3SiO_{\frac{1}{2}})_\alpha(Me_2SiO_{2/2})_\beta(MeSiO_{3/2})_\gamma(RMeSiO_{2/2})_\delta(R^5MeSiO_{2/2})_\epsilon(RMe_2SiO_{\frac{1}{2}})_\zeta$ wherein
   $\alpha+\zeta=\gamma+2$;
   $\alpha=0$ to $\gamma+2$;
   $\beta=10$ to 180;
   $\gamma=0$ to 15;
   $\delta=1$ to 40;
   $\epsilon=0$ to 20;
   $\zeta=0$ to $\gamma+2$;
   $\delta+\zeta\geq 2$;
   $\Sigma(\alpha+\beta+\gamma+\epsilon+\zeta)\geq 20\leq 200$; and
   R is a polyether of formula $-(CHR')_nO(C_2H_4O)_x(C_2H_3R''O)_zQ$ or a mixture thereof, wherein
   n is 2 to 10;
   $x+z=5$ to 40;

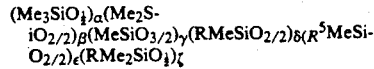

and with the proviso that when $z=0$, $x\leq 18$; and wherein
   R' is H, alkyl of 1 to 3 carbon atoms, phenyl, or alkyl-substituted phenyl in which the alkyl substituents contain 1 to 2 carbon atoms, and where there are several R' groups, these may be the same or different;
   R" is alkyl of 1 to 18 carbon atoms, phenyl, or alkyl-substituted phenyl in which the alkyl substituents contain 1 to 4 carbon atoms;
   Q is selected from the group consisting of:
   H;
   alkyl of 1 to 18 carbon atoms;
   benzyl;
   alkyl-substituted benzyl in which the alkyl substituents contain 1 to 4 carbon atoms;
   $CO_2R^2$ in which $R^2$ is alkyl of 1 to 2 carbon atoms;
   $CONHR^3$ in which $R^3$ in alkyl of 1 to 3 carbon atoms, phenyl, or alkyl-substituted phenyl in which the alkyl substituents contain 1 to 4 carbon atoms;
   $COR^4$ in which $R^4$ is alkyl of 1 to 18 carbon atoms, phenyl, or alkyl-substituted phenyl in which the alkyl substituents contain 1 to 4 carbon atoms; and
   $R^5$ is alkyl of 2 to 18 carbon atoms, phenyl, phenyl-substituted alkyl of 2 to 3 carbon atoms, or cyano- or fluoro-substituted alkyl of 2 to 18 carbon atoms;
   the ratio of hydrophilic character to lipophilic character for the second silicon polyether copolymer being $\geq 0.3$;
   the weight % of polyether groups in said second silicon polyether copolymers being at least 5% less than the weight % of polyether groups in said first silicone polyether copolymer; and
   said second silicone polyether copolymer constituting from about 0.05% to about 40% of the sum of said first and second silicone polyether copolymers;
2) allowing the mixture to foam; and
3) curing the foamed composition.

12. The method of claim 11 wherein in said second silicone polyether copolymer $\gamma=0$, $\alpha=0$, $\Sigma(\alpha+\beta+\delta+\zeta)\geq 45\leq 160$, and the ratio $x/(x+z)$ is $\geq 0.7$.

13. The method of claim 12 wherein in said second silicone polyether copolymer z in substituent R is 0, and x in substituent R is 6 to 14.

14. The method of claim 11 wherein in said second silicone polymer copolymer $\gamma=0$, $\epsilon=0$, $\zeta=0$, $\delta=4$ to 40, $\Sigma(\alpha+\beta+\zeta)\geq 60\leq 135$, and the ratio $x/(x+z)$ is $\geq 0.7$.

15. The method of claim 14 wherein in said second silicone polyether copolymer z in substituent R is 0, and x in substituent R is 6 to 14.

* * * * *